United States Patent [19]

Morin

[11] Patent Number: 4,661,532

[45] Date of Patent: Apr. 28, 1987

[54] COAL TAR CONTAINING FOAMING URETHANE COMPOSITION AND A METHOD FOR REPAIRING DEFECTS IN STRUCTURAL COMPONENTS

[75] Inventor: Sandra K. Morin, Coon Rapids, Minn.

[73] Assignee: H. B. Fuller Company, St. Paul, Minn.

[21] Appl. No.: 748,506

[22] Filed: Jun. 25, 1985

[51] Int. Cl.$^4$ ............................................. C08G 18/14
[52] U.S. Cl. ................................... 521/167; 238/370; 238/371; 264/36; 521/170; 521/174; 521/175; 521/176; 528/76; 528/78
[58] Field of Search ............... 521/170, 167, 174, 175, 521/176; 528/76, 78; 238/370, 371; 264/36

[56] References Cited

U.S. PATENT DOCUMENTS

| | | |
|---|---|---|
| 2,929,800 | 3/1960 | Hill, Jr. ............................... 260/77.5 |
| 3,182,032 | 5/1965 | Charlton et al. ........................ 260/28 |
| 3,191,864 | 6/1965 | Moses ................................... 238/371 |
| 3,351,573 | 11/1967 | Skreckoski ............................ 260/18 |
| 3,412,050 | 11/1968 | Elkin et al. ............................ 260/2.5 |
| 3,716,608 | 2/1973 | Neumann ................................ 264/36 |
| 3,717,606 | 2/1973 | Lomasney et al. ................. 260/40 R |
| 3,749,688 | 7/1973 | Milhelic et al. ........................ 260/28 |
| 3,899,455 | 8/1975 | Unterstenhoefer et al. ..... 260/2.5 B |
| 3,976,496 | 8/1976 | Wallouch ..................... 106/123 LC |
| 3,977,889 | 8/1976 | Shearing ................................ 106/96 |
| 4,070,201 | 1/1978 | Tessenske ....................... 106/281 R |
| 4,152,185 | 5/1979 | Tessenske ............................. 156/94 |
| 4,295,259 | 10/1981 | Rhodes et al. .................. 29/402.18 |
| 4,390,678 | 6/1983 | LaBelle et al. ......................... 528/60 |

FOREIGN PATENT DOCUMENTS 1578673 7/1969 France .
1323884 7/1973 United Kingdom .

OTHER PUBLICATIONS

DABCO ®, 33-LV Technical Bulletin
PAPI ®, 94 Technical Bulletin.
Dow Corning ®, 193 Surfactant Technical Bulletin, 1968.
M&T Catalyst 120 Technical Bulletin, 1981.
Poly-G ®, Polyether Polyols Technical Bulletin, 1977.
Poly-G ®, 71-357 Technical Bulletin, 1975.
CP524 Technical Bulletin, 1975.
CasChem Technical Bulletin 100, 1982.
DB ®, Oil Technical Bulletin, 1982.
Voranol TM, 800 Technical Bulletin.

*Primary Examiner*—Maurice J. Welsh
*Attorney, Agent, or Firm*—Merchant, Gould, Smith, Edell, Welter & Schmidt

[57] ABSTRACT

Hydrophobic polyurethane compositions can be used to repair or fill-in surface defects in structural components. The hydrophobic composition can be packaged in two parts, a hydrophobic polyol part and a isocyanate part wherein the polyol part comprises a polyol and a coal tar or pitch composition and the isocyanate part comprises a reactive isocyanate compound. The parts of the composition can be mixed and applied to surface defects of structural members such as railroad ties and can rapidly form a hard, permanent, strongly bonded repair.

23 Claims, No Drawings

COAL TAR CONTAINING FOAMING URETHANE COMPOSITION AND A METHOD FOR REPAIRING DEFECTS IN STRUCTURAL COMPONENTS

FIELD OF THE INVENTION

The invention relates to a hydrophobic-foaming polyurethane composition that can be packaged in separate parts, namely a hydrophobic polyol part and an isocyanate part. The parts can be combined at an effective stoichiometric ratio to form a hard, rigid solid foam mass. The invention also relates to the use of the polyurethane composition in the repair of surface defects in structural members such as spike holes left after spike removal from rialroad ties during road bed maintenance or repair.

BACKGROUND OF THE INVENTION

In view of current economic conditions, substantial attention has been given to the recycle of used structural components in new construction and in general maintenance. The use of used structural components can be an economic benefit since the cost of new materials is often substantially greater than the cost of obtaining the used material. Such recycle can be effective if the recycled material is structurally sound. Structurally sound recycled structural components can often be obtained if the components are repaired.

In the instance that the structural components are formed from materials such as wood, plastic, concrete and others, surface defects must be repaired before the component can be reused. Such defects can appear as cuts, gaps, deep holes, cracks, etc. Such defects can substantially reduce the value of the recycled component in new construction since the defect can result in a fastener having an imperfect bond to a structural member, the defect can be aesthetically unpleasing or the defect can reduce the structural strength of the member.

Materials used to repair surface defects in structural members should have certain characteristics. The material should be easily applied and should form high strength bonds to structural members made of varying materials. The repair materials should be usable in many environments including environments having extremes of heat and cold and having the presence of substantial quantities of environmental water.

One particularly important end use for such repair compositions is in the recycle or reuse of railroad ties. Typically in the maintenance of the railroad right of way the railroad rails, along with the tie plates and spikes, are removed from railroad ties which remain in the roadbed. If a new rail is to be spiked to the old tie, it is critical that the railroad tie spike holes be repaired prior to laying the new rail. The presence of spike holes in an old tie can cause problems since if a spike is driven into a portion of the tie near an old spike hole, the driving force of the spike can displace the spike from its intended location into an old hole, displacing the rail, tie plate and spike. In the instance that the spike is driven into incorrect location substantial economic loss can result in repairing the misaligned rail. If a misaligned rail is not repaired, the defect can cause derailment or other problems. Further, the spike holes can be the source of structural weakness in the tie.

Mechanical spike hole repair means have been suggested in the art in for example, Moses, U.S. Pat. No. 3,191,864 which teaches a mechanical spike hole insert used by first boring out an old spike hole, installing an insert and driving a new spike into the insert; and Newman, U.S. Pat. No. 3,716,608, which teaches metallic inserts that can be placed in bored out spike holes with a filling of a synthetic resin into which the spikes can be driven. In another area of repair, Tessenski, U.S. Pat. Nos. 4,070,201 and 4,152,185, teach a railroad tie spike hole plugging material and method using a substantial uniform mixture of a granular abrasive material and a granular plastic material which is poured into the hole left after spike removal. The driving force of a spike into the abrasive material generates heat which plasticizes the material resulting in a firm bond of the spike to the material. Mechanical and resin-based hole filling methods tend to be time consuming, expensive and adapted to manual not automatic application or installation.

Rhodes et al, U.S. Pat. No. 4,295,259, teaches a method of reusing wooden railroad ties in which spike holes are filled with a high-density, polyurethane foam composition. We have found that the use of polyurethane foam in filling spike holes in used railroad ties can present significant problems. The polyurethane foam compositions do not appear to adhere to a spike hole with sufficient adhesion to prevent the accidental removal of the foam repair mass during the repair and subsequent mechanical rail installation. Further, the urethane foams of the prior art tend to foam uncontrollably in the presence of substantial environmental moisture. Since, the moisture tends to accelerate the foaming properties of the urethane composition, the presence of water can cause the too rapid formation of a foam mass of low strength and density and can result in the formation of an incomplete or unreliable repair.

Accordingly, a substantial need exists in the art for compositions that can be used to repair surface defects on structural components such a railroad ties which provide a repair mass having strong adhesion to the substrate structural member, can be used in the presence of substantial quantities of environmental water and can be used in automatic application equipment.

BRIEF DISCUSSION OF THE INVENTION

We have found a two-package hydrophobic urethane foaming composition that can be used to repair surface defects in structural members by forming a rigid repair mass that bonds strongly to the structural member. The first package comprises a polyol made hydrophobic by the presence of an effective amount of a coal tar or coal tar pitch composition. The second package comprises an isocyanate compound having at least two —NCO groups. The two parts, when mixed at an effective stoichiometric mixing ratio to form a rigid mass, can be applied both manually and with automatic injection into surface defects in structural members, can repel and avoid an inappropriate reaction with water present at the application site and can rapidly form a hard, structurally sound, firmly bonded repair mass having strong adhesion to the substrate. The coal tar, in combination with the other components of the composition, appears to enhance many properties of the composition. The hydrophobicity of the injected urethane foam, enables the foam to repel any environmental water that is present in the application site and prevents the water from reacting with the mixed components. Further, the hydrophobic nature of the composition prevents the environmental water combining with the resulting foam to any significant extent. Since the hydrophobic nature of the composition repels water, the presence of environmental water in the repair site cannot alter the reaction rate or the combination of the reaction mixture. Further, the combination of the coal tar or coal tar pitch composition with the other components appears to result in an increased bond strength as a result of the interaction of the components and the surface defect.

Coal tars have been combined in urethane composition in the past. However, in the prior art compositions the coal tar or pitch composition is used in preparing an isocyanate prepolymer in which a di-, tri- or polyisocyanate compound is reacted with the coal tar to form an isocyanate prepolymer. As a result, in the prepolymer, the coal tar is effectively one moiety of the isocyanate compound. The coal tar-prepolymer composition can then be reacted with the polyols resulting in a urethane composition.

We have found that in the compositions of the invention, the coal tar pitch is most useful when included in the polyol and we believe that in such combination, the coal tar does not appear to participate in a polyisocyanate-polyol reaction and does not form an isocyanate prepolymer. The production prepolymers from coal tar and polyisocyanate compounds are disclosed in Schearing, U.K. Pat. No. 1,323,884; Carlton et al, U.S. Pat. No. 3,182,032; Elkin, U.S. Pat. No. 3,412,050; and Mihelic, U.S. Pat. No. 3,749,688.

DETAILED DISCUSSION OF THE INVENTION

The compositions of the invention can be made by combining a first package containing a hydrophobic coal tar containing polyol composition with a second package containing a polyisocyanate composition.

Coal Tar

Coal tar or coal tar pitch, that can be used in the hydrophobic polyol package, is a by-product of the manufacture of coke from coal. In the manufacture of coke, during the destructive distillation of coal, coal tar results from the high-temperature heat volitilization of organic constituents of coal and a solid coke residue comprising primarily elemental carbon remains. During the destructive distillation, compounds volatile at temperatures which range up to about 800° C. are driven off. Coal tar or coal tar pitch is the heavy fraction having the highest boiling points of the volatile compositions derived from coal. Coal tar pitch is typically a black solid comprising a variety of polynuclear aromatic compounds. The compounds can have from about 1 to 30–40 aromatic rings. Coal tar pitch tends to have an average molecular weight of about 300 to 1000 depending on the production facility and the source of the coal. The coal tar is an item of commerce and can be obtained from U.S. Steel Company, Allied Chemical Company, other steel manufacturers or coke producers.

Polyol

The term polyol includes many organic compounds having two or more hydroxyl groups on an essentially organic substrate. The term polyol includes diols, triols, tetraols, etc. including such compounds such as ethylene glycol, 1,2-butylene glycol, 1,3-butylene glycol, 1,4-butylene glycol, 1,4-cyclohexane diol, saccharide compounds, polysaccharide compounds, polyalkalene ether glycols, etc. The polyols can be used in both the hydrophobic polyol part and the polyisocyanate part.

The preferred polyol for use in the isocyanate composition is a polyalkylene glycol which is a composition having at least two hydroxyl groups and at least one terminal hydroxyl group. These compounds are ordinarily derived from the polymerization of cyclic ethers such as an alkylene oxide compound or from condensation of glycols, and are sometimes known as alkylene glycols, polyalkylene oxide glycols, polyglycols, or polyalkylene ether glycols. They may be represented by the formula HO(RO)$_n$H, in which R is an alkylene radical and n is an integer greater than 1. In the polyols useful in the invention, n is sufficiently large to result in a polyalklyene glycol having a molecular weight of at least 750. Not all the alkylene groups in the polymer chain need be the same. Polyalkylene glycols formed by the polymerization of a mixture of different alkylene oxides or glycols may be used. Polyalkylene glycol may be derived from a cyclic ether such a dioxolane, which results in a product having the formula HO(CH$_2$OC$_2$H$_4$O)$_n$H. Examples of the compounds which contain a mixture of alkylene groups and which are useful in the preparation of many compositions are those polyethers described in U.S. Pat. No. 2,492,955. The alkylene radicals may be straight-chain or may have branched chains as in the compound known as polypropylene ether glycol, having the formula:

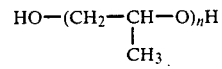

Wherein n is an integer of 10 to 30,000. Useful polyalkylene glycols are typically viscous liquids or waxy solids. Those most useful in the process and products of this invention have an average molecular weight of about 750–10,000. The molecular weight of the most preferred polyalkylene ether glycols range from about 750 to 3,500.

A preferred class of polyols for use in the hydrophobic coal tar containing polyol part comprises a polyol reaction product of a mono-, di- or polysaccharide compound with an alkanolamine compound. Saccharide compounds that can be used in the polyol composition include, glucose, fructose, galatose, etc.; disaccharides that can be used include sucrose, lactose, maltose, etc.; polysacchrides that can be used include various starches and other well-known compositions. Alkanolamine compounds that can be used in the hydrophobic polyol part compounds have the formula:

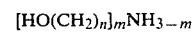

Wherein n and m are independently an integer of 1 to 3. The polyols are made by reacting the saccharide compound with the alkanolamine compound at approximately equimolar proportions resulting in a composition that reacts rapidly with the isocyanate. These compounds are commercially available as the "VORANOL 800 ®" and the "VORANOL 400 ®" polyether polyols made by Dow Chemical Company, and the Poly G ® polyols made by Olin Chemical Company (70-660; 71-530; 71-357).

Any of the wide variety of organic polyisocyanate compositions may be employed in the isocyanate part. Aromatic, aliphatic and cycloaliphatic polyisocyanates, polyisocyanate prepolymers and combinations thereof may be used. Representative compounds include 2,4-toluene diisocyanate (TDI), diphenyl methane diisocyanate (MDI), m-phenylene diisocyanate, 4-chloro-1,3-phenylene diisocyanate, 4,4'-biphenylene diisocyanate, 1,5-naphthylene diisocyanate, 1,4-tetramethylene diisocyanate, 6-hexamethylene diisocyanate, 1,10-decamethylene diisocyanate, 1,4-cyclohexylene diisocyanate, 4,4'-methylene-bis (cyclohexyl isocyanate) and others. Aromatic diisocyanates, those which have at least two isocyanate groups directly attached to an aromatic ring are preferred. Generally, aromatic isocyanates react in the urethane reaction more rapidly with polyols than the aliphatic isocyanates. MDI, diphenylmethane diisocyanate, is the preferred polyisocyanate for reasons for rapid reaction and economy. The isocyanate compounds can contain other substituents which do not substantially alter the reactive nature of the isocyanate groups.

Catalyst

The rate of reaction of the composition of this invention after mixing can be increased or enhanced as desired by the incorporation of effective amounts of catalysts to promote the reaction of the isocyanato groups with the polyol. Typically catalysts include organic amine compounds and organo tin compounds. Specific examples of useful catalysts include dibutyltindilaurate, stannous octoate, tertiary aliphatic and tertiary alicyclic amines including triethylamine, triethanolamine, tri-n-butylamine, trietylenediamine, alkylmorpholene, etc. Complex mixtures of such catalysts in modified form may also be employed.

Plasticizers can be used in the polyurethane compositions of this invention to improve viscosity of the parts and to improve hardness, flexural modulus, and cure time. Often a single plasticizer will be sufficient to impart the desired properties to the uncured packages and the cured foamed product. In certain instances two or more plasticizers can cooperate and can be used advantageously. Well-known plasticizers that can be used in the compositions of the invention include phthalate esters, alkyl phosphates, polyphenyls, aromatic oils, chlorinated waxes or paraffins, adipate esters, synthetic rubber polymers, natural oils, rosin and rosin derivatives, and polysulfide rubber. Typically the amount of plasticizer will arrange from 0.5 to 5 wt % of solids. Preferred plasticizers include polyphenyl plasticisizer and partially hydrogenated di- or triphenyl plasticizers.

Fillers, extenders, thickeners, additional catalysts, pigments and the like can be included in the polyurethane composition. Neutral fillers are ordinarily preferred to avoid gassing during or decomposition during storage. Acidic and basic fillers should be avoided.

In somewhat greater detail, the two-package polyurethane composition can be made by a process divided into two states which can be performed in any order. The first stage comprises formation of a hydrophobic polyol package and the second stage comprises the formation of the isocyanate package. The polyol package and the polyisocyanate package are individually prepared using commonly available blending and mixing techniques for isocyanate compositions. The two-package composition of the invention is most effectively used by mixing and applying the composition using automatic injection equipment that blends the packages at an appropriate ratio. Such apparatus is commonly available to the industry and can be adapted to the repair of a variety of structural members.

Typically the hydrophobic polyol composition contains an effective amount of a polyol to participate in the urethane reaction and an effective hydrophobic amount of a coal tar composition comprising about 100 to 65 parts of polyol and 0.1 to 35 parts of coal tar preferably the hydrophobic polyol contains 90 to 80 parts of polyol and 10 to 20 parts of coal tar. Most preferably for reasons of economy, bond strength and hydrophobic properties, the hydrophobic polyol contains about 82.5 to 87.5 parts of polyol and from about 12.5 to 17.5 parts of coal tar.

The isocyanate composition can contain from about 100 to 50 parts of the isocyanate compound and from about 0.1 to 50 parts of a polyol mixture thereof. The polyol mixture can contain from 1 to 10 additional polyol compositions and each polyol composition can be present at a concentration of from about 0.1 to 50 parts of the isocyanate package.

The packages are blended and applied at a ratio of —OH groups in the hydrophobic polyol package to the —NCO groups in the polyisocyanate package sufficient to result in a rigid, strongly bonding repair mass. Typically the packages are blended at —NCO to —OH ratio of about 0.1 to 10 moles of —NCO per mole —OH groups. Preferably the ratio is more nearly stoichiometric and is about 0.25 to 5 moles of NCO per mole of hydroxyl and most preferably for reasons of rapid reaction and bond strength, the ratio is about 0.9 to 1.25 moles of —NCO per mole of —OH.

In the repair of a railroad tie, the composition of the invention is preferably applied to spike holes using an automatic mixing and injection machine that is part of a track repair machine that in one procedure removes the spike and spike plate, lifts or replaces the railroad rail, repairs spike holes using the polyisocyanate composition of the invention, replaces the spike plate and rail and respikes the assembly together. Sufficient time can be given to insure that the foaming isocyanate composition is fully set prior to reassembly.

The following examples provide a further understanding of the compositions of the invention and include a best mode.

EXAMPLE I

Into an industrial Cowles dissolver was placed 35.0 parts of a polyol reaction product between sucrose and diethanolamine having an average molecular weight of about 720, a hydroxyl number of about 350±10, and approximately 4.5 hydroxyl groups per mole (POLY-G 71-357, OLIN CHEM CO.); 35.0 parts of castor oil, a triglyceride of 12-hydroxy-oleic acid (ricinoleic acid); and 14.5 parts of another polyether polyol reaction product of sucrose and diethanolamine having a hydroxyl number of 800 (VORANOL 800 ®, Dow Chemical Company). The Cowles dissolver was operated at low speed until the mixture was homogeneous. Into the mixture was added 0.5 parts of a tertiary aliphatic amine catalyst (Dabco 33-LV), 0.2 parts of tri-n-butyltin mercaptide catalyst (Catalyst 120-M&T Chemical Company) and 2.0 parts of a silicone defoamer (Dow-Corning DC-193 Silicone surfactant). The mixture was sheared until uniform and to the agitated mixture was added 12.6 parts of coal tar (CP-524 Allied Chemical Company) and 0.2 parts of water. The resulting mixture was blended until completely homogenous. The resulting hydrophobic polyol composition had an initial viscosity of 1800 cP, Brookfield viscosity #3 spindle @ 20 rpm and 77° F.

The isocyanate composition was made by adding to a Cowles dispersing ribbon mixer at room temperature about 16.2 parts of a polypropylene glycol polyol having an average molecular weight of about 1000 and an average hydroxyl number of about 168 (Poly G 30-168 Olin Chemicals), 79 parts of diphenyl methane diisocyanate (—NCO functionality 2.2, PAPI 94-Upjohn Company) and 4.8 parts of a quadraphenyl plasticizer (MXP-2020 Monsanto Chemical Company) under conditions of mixing and under vacuum.

The polyol composition was mixed with the isocyanate composition at a 1 to 1 volume ratio under automated mechanical mixing. After mixing, the resulting rigid foam had a density of 20.0 pounds per cubic foot. The cream time, the time at which the first bubble formation and the first sharp exotherm was noted, was about 15 seconds after mixing. The rise time, the total time of volume increase, was 20 to 40 seconds. The foam was tack free after about 45 seconds.

EXAMPLE II

Example I was repeated except that in the hydrophobic polyol part a tertiary amine catalyst (Fomrez UL-1 Witco Company) was substituted for the tri-n-butyltin mercaptan catalyst and in the isocyanate package an diphenyl methane diisocyanate —NCO functionality 2.7, PAPI-27 Upjohn Company) was substituted for the PAPI-94. The hydrophobic polyol part and the isocyanate part were blended at a 1 to 1 ratio by volume. The resulting product had a cream time of 15-20 seconds, a rise time of 20-40 seconds, a tack free time of 40-50 seconds and a foam density of about 15.5 pounds per cubic foot.

The specification example and data presented above provide a basis for understanding the invention. However, since many embodiments and variations can be made within the invention without departing from the spirit and scope of the invention, the invention resides in the claims hereinafter appended.

I claim:

1. A method of repair of a structural member having a surface defect, with a foaming hydrophobic urethane composition that can repair the defect in the presence of environmental water and can form a strong bond, which comprises:
   (a) locating a surface defect in a structural member;
   (b) obtaining a hydrophobic two package polyurethane composition comprising:
      (i) in a first package, a hydrophobic polyol having about 99.5 to 55 parts of a polyol composition, about 0.1 to 45 parts of a coal tar, an effective foaming amount of water and an effective amount of a polyurethane catalyst;
      (ii) in a second package, an isocyanate composition comprising an isocyanate compound having at least two —NCO groups; and
   (c) blending the first and second packages at a —OH to —NCO mole ratio of about 0.1 to 10:1 to form a blended hydrophobic polyurethane composition; and
   (d) applying the blended hydrophobic polyurethane composition to the surface defect.

2. The method of claim 1, wherein the structural member is a structural member made of wood.

3. The method of claim 2, wherein the structural member is a railroad tie having at least one spike hole.

4. The method of claim 1 (i), wherein the polyol is a reaction product of a mono-, di- or tri-polysaccharide with an alkanolamine compound.

5. The method of claim 4, wherein the alkanolamine compound is diethanolamine.

6. The method of claim 1, wherein the isocyanate compound is diphenyl methane diisocyanate.

7. The method of claim 1 (i), wherein the isocyanate composition additionally comprises a polyalkylene glycol.

8. The method of claim 7, wherein the polyalkylene glycol is polyethylene glycol.

9. The method of claim 1, wherein the catalyst is a tertiary amine catalyst, an organo tin catalyst, or mixtures thereof.

10. A two package polyurethane composition that can be combined and applied to a structural member to form a rigid high-density foam that is hydrophobic which consists essentially of:
    (a) in a first package a hydrophobic polyol composition comprising about 99.9 to 55 parts of a polyol composition, about 0.1 to 45 parts of coal tar, an effective foaming amount of water and a polyurethane catalyst; and
    (b) in a second package an isocyanate composition comprising an isocyanate compound having at least two —NCO groups;
    wherein the first package and the second package can be combined at a —OH to —NCO mole ratio of about 0.1 to 10:1.

11. The composition of claim 10, wherein in the hydrophobic polyol composition, the polyol is a reaction product of a mono-, di- or tri-saccharide and an alkanolamine.

12. The composition of claim 11, wherein the alkanolamine is diethanolamine.

13. The composition of claim 12, wherein the polyol is a mixture of the reaction product and a polyalkylene glycol.

14. The composition of claim 13, wherein the polyalkylene glycol comprises polyethylene glycol, polypropylene glycol or mixtures thereof.

15. The composition of claim 14, wherein the polyol also contains 0.1 to 1 parts of a ricinoleic acid triglyceride per each part of the reaction product.

16. The composition of claim 10, wherein in the first package the hydrophobic polyol comprises about 90 to 80 parts of the polyol composition and about 10 to 20 parts of the coal tar.

17. The composition of claim 16, wherein the catalyst is a tertiary amine catalyst, an organo tin catalyst, or mixtures thereof.

18. The composition of claim 10, wherein the isocyanate composition comprises about 99.5 to 50 parts of the isocyanate compound and about 50 to 0.5 parts of alkylene glycol.

19. The composition of claim 18, wherein the polyalkylene glycol is polypropylene glycol.

20. The composition of claim 10, wherein the isocyanate composition comprises 95.5 to 45 parts of the isocyanate compound, 45 to 0.5 parts of the alkylene glycol and 10 to 0.5 parts of a compatible plasticizer.

21. The composition of claim 10, wherein the isocyanate composition comprises diphenylmethane diisocyanate.

22. The composition of claim 10, wherein in the first package the hydrophobic polyol composition also contains from about 0.01 to 1 part of water per each part of the polyol.

23. A two package hydrophobic polyurethane composition that can be combined and applied to repair spike holes in a railroad tie to form a rigid high-density foam repair which comprises:

(a) in a first package, a hydrophobic polyol composition comprising about 30 to 40 wt-% of a reaction product of a mono-, di- or tri-saccharide of a dialkanolamine; about 30 to 40 wt-% of a ricinoleic acid triglyceride; about 10 to 15 wt-% of a reaction product of a mono-, di- or tri-saccharide and a dialkanolamine having a molecular weight of about 800; about 10 to 20 wt-% of coal tar; about 0.1 to 5 parts of water and an effective amount of a polyurethane catalyst; and (b) in a second package, an isocyanate composition comprising about 10 to 20 wt-% of a polyalkylene glycol composition; about 60 to 95 wt-% of diphenylmethane diisocyanate and 1 to 10 wt-% of a compatible plasticizer;

wherein the first package and the second package can be combined at a —OH to —NCO mole ratio of about 1.0 to 10:1.

* * * * *